United States Patent [19]

Hanada et al.

[11] Patent Number: 5,291,801

[45] Date of Patent: Mar. 8, 1994

[54] GEAR DEVICE

[75] Inventors: Seigo Hanada; Yukio Fukuchi; Junji Kawamoto; Koji Nakamura; Masahiro Abe, all of Hiroshima, Japan

[73] Assignee: The Japan Steel Works, Ltd., Tokyo, Japan

[21] Appl. No.: 899,275

[22] Filed: Jun. 16, 1992

[30] Foreign Application Priority Data

Jun. 20, 1991 [JP] Japan ................... 3-046649

[51] Int. Cl.[5] .................. F16H 57/02; E04B 1/99; F16F 15/00
[52] U.S. Cl. .................. 74/606 R; 74/421 R; 181/198
[58] Field of Search ............ 74/421 R, 421 A, 606 R; 181/198, 200, 202

[56] References Cited

U.S. PATENT DOCUMENTS

| | | | |
|---|---|---|---|
| 2,237,958 | 4/1941 | Hansen et al. | 74/606 R |
| 3,263,521 | 8/1966 | Muller | 74/606 |
| 3,860,844 | 1/1975 | Hetzel | 74/606 R X |
| 3,897,693 | 8/1975 | Garman et al. | 74/606 R X |
| 4,347,043 | 8/1982 | Morris | 181/202 X |
| 4,686,868 | 8/1987 | Heidrich | 74/606 R |

FOREIGN PATENT DOCUMENTS

| | | |
|---|---|---|
| 57-1845 | 1/1982 | Japan ................... 74/606 |
| 59-19180 | 5/1984 | Japan . |

*Primary Examiner*—Allan D. Herrmann
*Attorney, Agent, or Firm*—Sughrue, Mion, Zinn, Macpeak & Seas

[57] ABSTRACT

A low noise type reduction gear which assures that sound generated by collision of particles of a lubricant with a wall surface of a casing and sound attributable to resonance of the casing can substantially be attenuated by arranging laminated vibration damping steel sheets inside of the casing.

11 Claims, 2 Drawing Sheets

GEAR DEVICE

BACKGROUND OF THE INVENTION

1. Field of the Invention

The present invention relates generally to a gear device. More particularly, the present invention relates to a low noise type gear device wherein leakage of sound, generated by gear meshing and collision of splash and drops of a lubricant with a wall surface of the casing, and sound attributable to resonance of the casing, can be reliably prevented.

2. Description of the Related Art

Various conventional gear devices of the aforementioned type are in practical use. Among them, a typical conventional gear device (reduction gear) will briefly be described below with reference to FIG. 3.

In FIG. 3, reference numeral 1 designates a casing which is of an entirely closed box-shaped configuration. The casing 1 includes a side wall 1A and a side wall 1B. First bearing set 2A, second bearing set 2B and third bearing set 2C are fitted into both the side walls 1A and 1B of the casing 1. An input shaft 4 is rotatably supported by the third bearing set 2C while a first gear 3A is fixedly mounted on the input shaft 4. An intermediate shaft 5 is rotatably supported by the second bearing set 2B while a second gear 3B and a fourth gear 3D are fixedly mounted on the intermediate shaft 5. Similarly, an output shaft 6 is rotatably supported by the first bearing set 2A while a third gear 3C is fixedly mounted on the output shaft 6.

The fourth gear 3D is fixedly mounted adjacent to the second gear 3B on the intermediate shaft 5. Accordingly, the first gear 3A meshes with the second gear 3B and the third gear 3C meshes with the fourth gear 3D.

One end 4a of the input shaft 4 projects outward of an outer wall 1a of the casing 1, while one end 6a of the output shaft 6 projects outward of the outer wall 1a of the casing 1.

A sound-proofing member 7, molded of a rubber, a synthetic resin or the like, covers the whole outer wall 1a of the casing 1 so as to prevent sound generated by meshing engagement of the gears 3A to 3D and sound generated by collision of splash and drops of a lubricant utilized in the device with an inner wall 1b of the case 1 from traveling to the outside of the casing.

Although not illustrated for the purpose of simplification, another conventional gear device of the aforementioned type is constructed such that the bearing sets are arranged on the inner wall 1b of the casing 1, as opposed to being fitted into the wall. Otherwise, operation of this device is similar to that of the device illustrated in FIG. 3.

Conventional gear devices, constructed in the above-described manner, have several limitations. Specifically, in the case of the first-mentioned conventional gear device, a large space is required for installation, and moreover, it requires a large quantity of sound-proofing materials. Consequently, it is expensive to manufacture and apply.

Also, heat generated by meshing engagement of the respective gears in the casing cannot be easily diverged to the outside of the sound-proofing cover through the casing. For this reason, the bearings and other associated components may become thermally damaged.

In addition, the aesthetic appearance of the gear device is degraded and maintenance is difficult to perform due to the sound-proofing material on the casing.

In the case of the second conventional gear device discussed above, it unavoidably requires even larger dimensions, resulting in an increase in production cost. It should be added that this type gear device also does not operate satisfactorily.

SUMMARY OF THE INVENTION

The present invention has been made in order to solve the aforementioned problems. Thus, an object of the present invention is to provide a low noise type gear device which assures that leakage of gear meshing sound generated by and collision sound to the outside and generation of unpleasant noise attributable to resonance of the casing are prevented.

According to the present invention, there is provided a gear device including a casing having a plurality of bearings fitted therein, an input shaft, an intermediate shaft and an output shaft. The input shaft, the intermediate shaft and the output shaft are operatively connected to each other via gears fixedly mounted thereto. Laminated vibration damping and sound absorbing steel sheets are arranged inside of the casing.

In particular, a plurality of projection-shaped seats are formed on an inner wall of the casing, and a hollow space is formed between the inner wall of the casing and the laminated vibration damping and sound absorbing steel sheets by mounting the laminated steel sheets on the seats with bolts, or the like. The casing of the invention is constructed in a closed configuration.

With the gear device of the present invention, the laminated vibration damping and sound absorbing steel sheets are arranged around the inner wall of the casing with a space between the sheets and the inner wall. Accordingly, splash and drops of lubricant will collide with the laminated vibration damping steel sheets, not the wall of the casing. Thus, noisy sound and vibration are not emitted to the outside of the casing, resulting in a remarkable sound-proofing effect.

Unpleasant sounds generated by the meshing engagement of the gears also does not reach the casing, but is absorbed in the laminated vibration damping and sound absorbing steel sheets. Consequently, leakage of this sound to the outside is also prevented.

DETAILED DESCRIPTION OF THE PREFERRED EMBODIMENT

Figure 1:
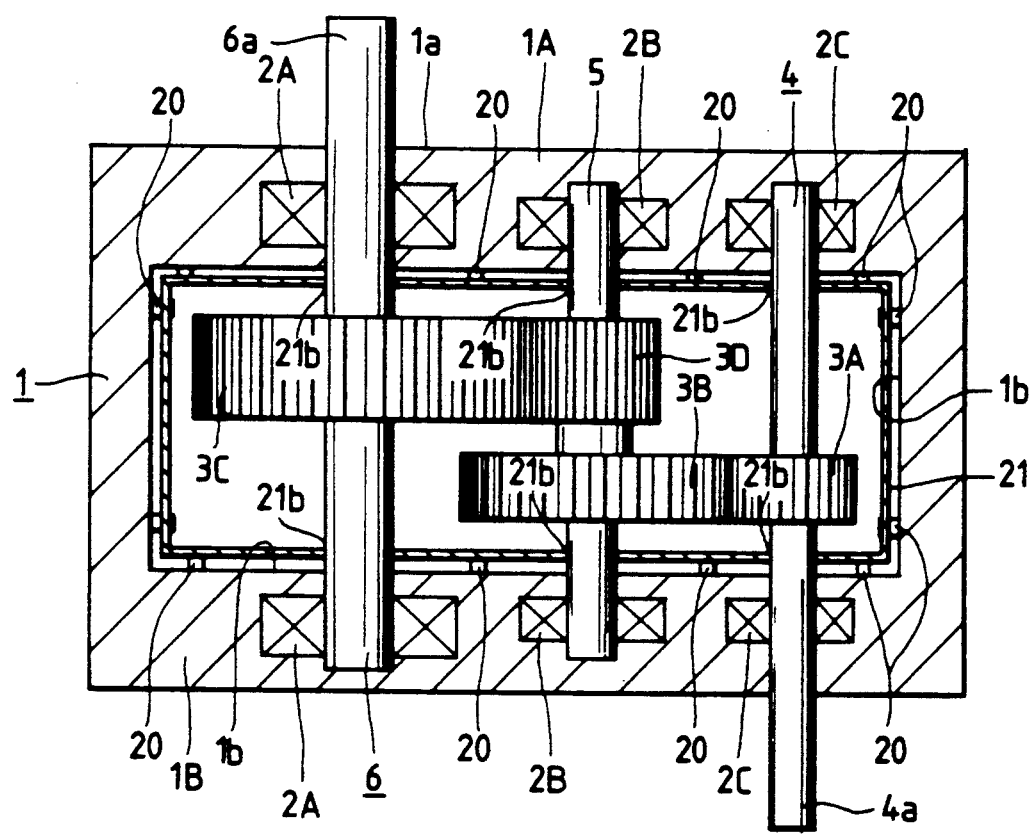
FIG. 1 is a cross-sectional view of a reduction gear in accordance with an embodiment of the present invention.
Figure 2A:
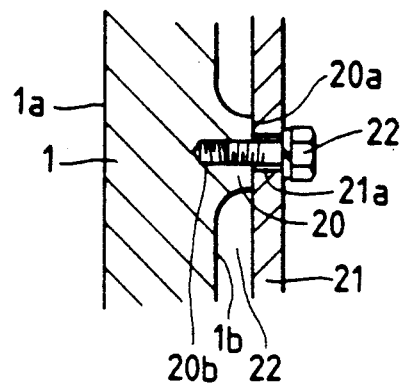
FIG. 2A is a fragmentary sectional view of the reduction gear shown in FIG. 1, particularly illustrating essential components for the reduction gear on an enlarged scale.

The present invention will now be described in detail with reference to the accompanying drawings which illustrate a preferred embodiment of the present invention. It should be noted that same or similar components to those of the conventional gear device are represented by like reference numerals. FIG. 1 is a sectional view of gear device (a reduction gear) in accordance with the embodiment of the present invention, and FIG. 2A is a fragmentary sectional view of the reduction gear shown in FIG. 1, particularly illustrating essential components for the reduction gear on an enlarged scale.

In FIG. 1, reference numeral 1 designates a casing designed in a box-shaped closed configuration. The casing 1 includes a side wall 1A and a side wall 1B. A first bearing set 2A, second bearing set 2B and third bearing set 2C are fitted into the side walls 1A and 1B as illustrated. An input shaft 4, having a first gear 3A fixedly mounted thereon, is rotatably supported by the third bearing set 2C, and an intermediate shaft 5, having a second gear 3B and a fourth gear 3D fixedly mounted thereon, is rotatably supported by the second bearing set 2B. Similarly, an output shaft 6, having a third gear 3C fixedly mounted thereon, is rotatably supported by the first bearing set 2A.

The fourth gear 3D is fixedly mounted adjacent to the second gear 3B on the intermediate shaft 5. With this construction, the first gear 3A meshes with the second gear 3B, while the third gear 3C meshes with the fourth gear 3D.

One end 4a of the input shaft 4 projects out of the side wall 1B, while one end 6a of the output shaft 6 projects out of the side wall 1A.

The casing 1 is made of, e.g., a cast steel, or the like. A plurality of projection-shaped seats 20 are formed integral with an inner wall 1b of the casing 1 (see FIG. 2A). Laminated vibration damping and sound absorbing steel sheets 21, each having substantially the same shape as that of the inner wall 1b of the casing 1 are mounted on the end surfaces of the seats 20. Thus, the laminated vibration damping and sound absorbing steel sheets 21 are located inside of the inner wall 1b of the casing 1.

It should be noted that each laminated vibration damping and sound absorbing steel sheet 21 is designed to exhibit excellent vibration damping and sound absorbing properties as disclosed in an official gazette of, e.g., Japanese Examined Publication Patent No. 59-19180. Also, steel sheets 21 may have a laminated structure composed of a plurality of steel layers having respective resonance frequencies different from each other. Each of the shafts 4, 5 and 6 extends through a guide hole 21b which is formed in the laminated vibration damping and sound absorbing steel sheet 21.

A female-threaded hole 20b is formed through each seat 20, and the laminated vibration damping and sound absorbing steel sheet 21 is immovably secured to the inner wall 1b of the casing 1 by threadably engaging male-threaded fitting bolts 22 with the female-threaded holes 20b while extending through fitting holes 21a of steel sheets 21.

Figure 2B:
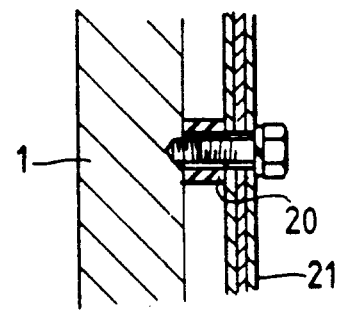
FIG. 2B is a fragmentary sectional view similar to FIG. 2A but of an alternative arrangement.
Figure 3:
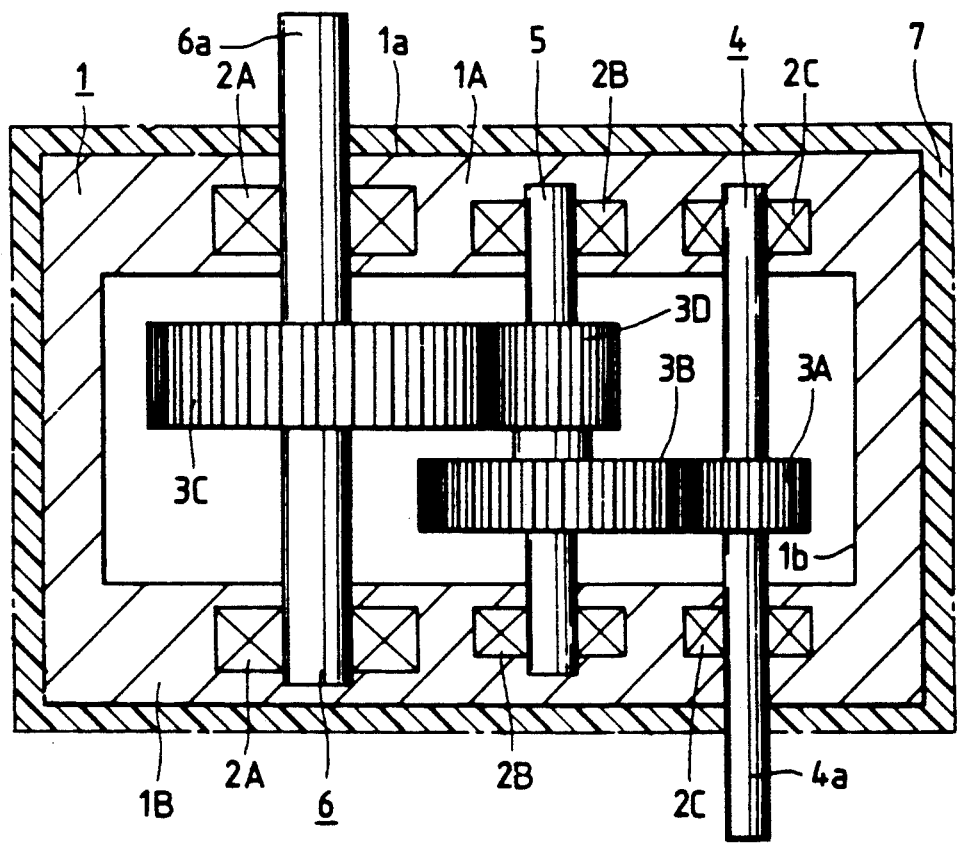
FIG. 3 is a cross-sectional view of a conventional reduction gear.

As is best seen in FIG. 2A, a hollow space 22 is formed between the laminated vibration damping and sound absorbing steel sheet 21 and the inner wall 1b of the casing 1. Thus, the laminated vibration damping and sound absorbing steel sheet 21 is maintained in a floating state with respect to the inner wall 1b of the casing 1 with the hollow space 22 located therebetween. It should be added that each seat 20 is not limited only to the integral structure integrated with the inner wall 1b of the casing 1 but it may be in the form of an independent member molded of a rubber or the like (see FIG. 2B). Also, steel sheets 21 may be fixed to seats 20 in any suitable manner.

With the reduction gear constructed in the above-described manner, as the input shaft 4 is rotated, the intermediate shaft 5 is rotated via the first gear 3A and the second gear 3B, and subsequently, the output shaft 6 is rotated via the fourth gear 3D and the third gear 3C. Consequently, rotation of the input shaft 4 is transmitted to the output shaft 6 with a predetermined speed reduction ratio. While rotation of the input shaft 4 is transmitted to the output shaft 6 in the above-described manner, lubricant (not shown) is scattered away from the respective gears 3A to 3D as they are rotated and then splash and drops of the lubricant collide with the respective laminated vibration damping and sound absorbing steel sheets 21 but do not reach the casing 1. Sound generated when the scattered splash and drops of lubricant collide with each laminated vibration damping and sound absorbing steel sheet 21 is absorbed in the laminated steel sheet 21. Thus, each laminated vibration damping and sound absorbing steel sheet 21 serves to prevent this sound from being emitted outside of the casing 1.

In addition, sound and vibration generated by meshing engagement of the respective gears 3A to 3D are mostly absorbed in the laminated steel sheets 21 without reaching the casing 1. Thus, leakage of this sound to the outside of the casing 1 can also be substantially prevented.

Based upon the results of a series of experiments, sound can be attenuated by a quantity of 5 to 10 dB(A) greater than the attenuation of conventional reduction gears having no vibration damping and sound absorbing means.

Since the reduction gear of the present invention is constructed in the above-described manner, the following advantages are obtained.

Arrangement of laminated vibration damping and sound absorbing steel sheets inside of the inner wall of the casing can prevent sound generated by meshing engagement of the respective gears from being transmitted to the casing. In addition, splash and drops of a lubricant scattered from the rotating gears will not collide with the casing due to the arrangement of the laminated vibration damping and sound absorbing steel sheets. Thus, leakage of the sound out of the casing can be reduced remarkably. In other words, the sound can be attenuated by a quantity of about 5 to 10 dB(A) compared with the conventional reduction gear.

Further, since there is no need to secure a sound-proofing material to the outer wall of the casing, the reduction gear itself can be designed with smaller dimensions.

Additionally, since a known design of fitting bearings into the side wall of the casing can be employed for the reduction gear, the latter can be constructed without the necessity of changing the present dimensions of the casing.

Of course, the present invention may utilize any number of shafts and gears arranged for reduction, or other purposes. For example, the present invention has been explained along the reduction gear, but the present invention may be applied to any gear device, e.g. a speed-increase gear. Also, in the drawing the casing of the gear device is illustrated in a closed box-shaped configuration, but the present invention may be applied to a casing having a complicated configuration such as a transmission case of an automotive vehicle.

The invention has been described through a preferred embodiment thereof. However, various modifications will be apparent to those skilled in the art. Such modifications do not depart from the scope of the subject invention as defined by the appended claims.

We claim:

1. A gear device, comprising:

a casing;

an input shaft rotatably mounted in said casing;

an output shaft rotatably mounted in said casing;

at least a first gear fixedly mounted on said input shaft, at least a second gear fixedly mounted on said output shaft;

said first gear and said second gear being operatively engaged so as to cause said output shaft to rotate at a second speed when said input shaft is rotated at a first speed; and a plurality of vibration damping and sound absorbing sheets continuously arranged inside of said casing along substantially an entire periphery of an inner wall of said casing, said sheets being fixed upon an inner wall of the casing so as to define a space between said sheets and the entire periphery of said inner wall.

2. A gear device as claimed in claim 1, further comprising:

at least one intermediate shaft rotatably mounted in said casing and having at least a third gear and a fourth gear fixedly mounted thereon, said first gear being engaged with said third gear and said second gear being engaged with said fourth gear.

3. A gear device as claimed in claim 1, further comprising:

a plurality of seats formed on the inner wall of said casing so as to project therefrom, said sheets being fixed upon a mounting surface of said seats so as to define the space between said sheets and the entire periphery of said inner wall.

4. A gear device as claimed in claim 3, wherein said sheets are steel.

5. A gear device as claimed in claim 3, wherein one of said sheets is affixed proximate to each said inner wall so as to define a space between each corresponding surface of said inner wall and a corresponding one of said sheets at all positions of said inner wall remote from said seats.

6. A gear device as claimed in claim 3, wherein said casing has a box-shaped, closed construction.

7. A gear device as claimed in claim 1, wherein said sheets have a continuous, non-perforated structure.

8. A gear device as claimed in claim 1, wherein said sheets arranged inside of said casing have a shape substantially the same as an interior periphery of said casing.

9. A gear device according to claim 1, wherein said casing has an integrally formed structure.

10. A gear device, comprising:

a casing;

an input shaft rotatably mounted in said casing;

an output shaft rotatably mounted in said casing;

at least a first gear fixedly mounted on said input shaft, at least a second gear fixedly mounted on said output shaft;

said first gear and said second gear being operatively engaged so as to cause said output shaft to rotate at a second speed when said input shaft is rotated at a first speed;

a plurality of vibration damping and sound absorbing sheets arranged inside of said casing, and a plurality of seats formed on an inner wall of said casing so as to project therefrom, said sheets being fixed upon a mounting surface of said seats so as to define a space between said sheets and said inner wall, wherein said sheets are formed of a laminated construction.

11. A gear device, comprising:

a casing;

an input shaft rotatably mounted in said casing;

an output shaft rotatably mounted in said casing;

at least a first gear fixedly mounted on said input shaft, at least a second gear fixedly mounted on said output shaft;

said first gear and said second gear being operatively engaged so as to cause said output shaft to rotate at a second speed when said input shaft is rotated at a first speed;

a plurality of vibration damping and sound absorbing sheets arranged inside of said casing, and a plurality of seats formed on an inner wall of said casing so as to project therefrom, said sheets being fixed upon a mounting surface of said seats so as to define a space between said sheets and said inner wall, wherein said sheets have respective vibrational characteristics which are different from each other so as to absorb sounds generated in the gear device.

* * * * *